UNITED STATES PATENT OFFICE.

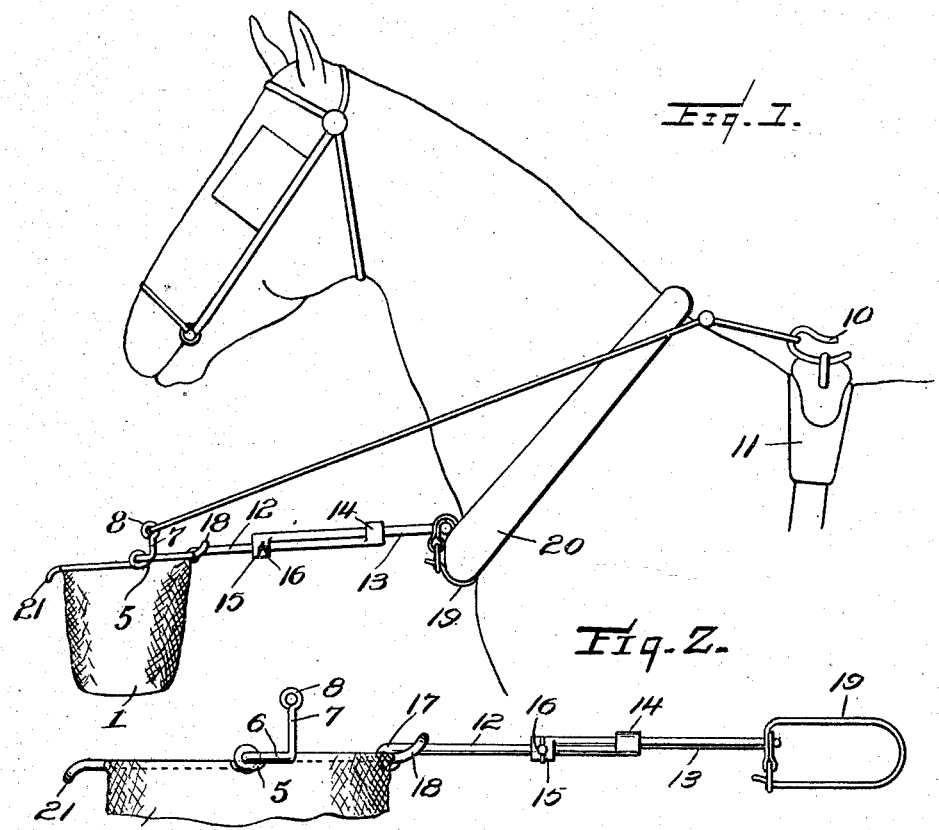

CHARLIE A. BOYD, OF SPENCER, NORTH CAROLINA.

FEED-BAG.

970,299.     Specification of Letters Patent.     Patented Sept. 13, 1910.

Application filed April 24, 1909. Serial No. 491,968.

*To all whom it may concern:*

Be it known that I, CHARLIE A. BOYD, a citizen of the United States, residing at Spencer, in the county of Rowan and State of North Carolina, have invented new and useful Improvements in Feed-Bags, of which the following is a specification.

This invention relates to feed bags for animals, the object of the invention being to provide a simple, collapsible or folding feed bag and supporting means therefor adapting the bag to be supported and sustained in a convenient position to enable an animal to feed therefrom, the supporting means being adjustable to suit any animal.

With the above and other objects in view, the invention consists in the novel construction, combination and arrangement of parts as herein fully described, illustrated and claimed.

In the accompanying drawings, Figure 1 is a side elevation of the feed bag, showing the same applied to the animal. Fig. 2 is an enlarged side elevation showing a portion of the bag and the longitudinally extensible support. Fig. 3 is a plan view of the same. Fig. 4 is a side elevation of the bag suspended hoop and extensible support folded.

Referring to the drawings, 1 designates the bag proper which may be of any suitable material and size. The bag is supported at its upper edge or mouth by means of a bag suspending hoop illustrated in Figs. 2 and 3 wherein will be seen that said hoop is circular and consists of two semi-circular sections 2 and 3 which are connected hingedly together at diametrically opposite points as shown at 4. These sections 2 and 3 are preferably formed of suitable lengths of wire having the terminal portions thereof looped together and in the formation of said loops, one of the sections is provided with shoulders 5, which, when the sections are in a substantially common plane, bear against the portions 6 of the looped extremities of the other section, thereby maintaining the two sections of the suspending hoop in substantially the same plane as shown at Figs. 1 and 2. The ends of one of the sections 3 are extended upward to form suspending arms 7 terminating in eyes 8 adapted to receive one or more suspending connections 9 such as cords which pass upward over the head of the animal and rearward where they may be connected to the check hook 10 of the harness saddle 11 thus holding the feed bag close to the mouth of the animal, as seen in Fig. 1.

In connection with the bag suspending hook I employ a longitudinally extensible support embodying a pair of relatively slidable members 12 and 13, the member 12 being provided with an eye 14 through which the member 13 is slidable, while the member 13 is provided with an eye 15 through which the member 12 is slidable. One of said eyes is provided with a binding screw 16 by means of which the adjustment of the relatively slidable member 12 and 13 may be fixed. The support just described has a jointed connection at one end with the bag suspending hoop as shown at 17, where said support passes through an upwardly curved slotted lug 18 extending laterally and radially outward from the hoop. At its opposite end said extensible support is provided with a strap 19 adapted to be passed around a collar 20 as shown in Fig. 1 to suitably anchor the device as a whole. At the side opposite the slotted lug 18 is a corresponding reversely curved slotted lug 21 which, when the sections 2 and 3 are folded together as shown in Fig. 4, lie in contact with each other in compact relation as shown in Fig. 4. In the figure last referred to, it will also be noted that the semi-circular sections 2 and 3 of the bag suspending hoop, fold together like the frame of an ordinary pocket purse and that the members of the longitudinally extensible support may also be slid together in compact relation to each other and the sections of the hoop enabling the bag and its supporting means to be stored away in a small space.

The feed bag hereinabove described is easily adjusted and fitted to any animal in an expeditious and effective manner and by the connections described the bag may be held in a convenient position for the animal to feed easily therefrom. The bag and its supporting means may be quickly detached from the animal and folded and stored away.

I claim:

A feed bag for animals in combination with supporting means for the bag comprising a bag suspending hoop embodying a pair of semi-circular sections one of which has terminal eyes while the other section has its end portions inserted through said eyes and bent to form angular upstanding suspending arms, shoulders adjacent to said eyes for sustaining the sections in substantially the same plane, a suspending connection attached to said upstanding arms, and a longitudinally extensible support connected at one end to said hoop and provided at its opposite end with a connection applicable to a part of the harness.

In testimony whereof I affix my signature in presence of two witnesses.

CHARLIE A. BOYD.

Witnesses:
A. W. HICKS,
C. H. MORRISON.